(12) United States Patent
Kato

(10) Patent No.: US 9,273,498 B2
(45) Date of Patent: Mar. 1, 2016

(54) CAB FOR CONSTRUCTION MACHINE AND CONSTRUCTION MACHINE

(71) Applicant: KOMATSU LTD., Tokyo (JP)

(72) Inventor: Yasunari Kato, Komatsu (JP)

(73) Assignee: KOMATSU LTD., Tokyo (JP)

( * ) Notice: Subject to any disclaimer, the term of this patent is extended or adjusted under 35 U.S.C. 154(b) by 35 days.

(21) Appl. No.: 14/346,051

(22) PCT Filed: Oct. 8, 2013

(86) PCT No.: PCT/JP2013/077324
§ 371 (c)(1),
(2) Date: Mar. 20, 2014

(87) PCT Pub. No.: WO2014/181483
PCT Pub. Date: Nov. 13, 2014

(65) Prior Publication Data
US 2015/0218855 A1 Aug. 6, 2015

(30) Foreign Application Priority Data

Sep. 2, 2013 (JP) ................................ 2013-181546

(51) Int. Cl.
| | |
|---|---|
| *E05B 3/08* | (2006.01) |
| *E05B 85/12* | (2014.01) |
| *E05B 1/00* | (2006.01) |
| *B60J 5/04* | (2006.01) |
| *E05B 79/20* | (2014.01) |
| *E05B 83/42* | (2014.01) |
| *E05B 85/14* | (2014.01) |
| *E02F 9/16* | (2006.01) |

(52) U.S. Cl.
CPC ............... *E05B 85/12* (2013.01); *B60J 5/0487* (2013.01); *E05B 1/00* (2013.01); *E05B 79/20* (2013.01); *E05B 83/42* (2013.01); *E05B 85/14* (2013.01); *E02F 9/163* (2013.01); *Y10T 292/57* (2015.04)

(58) Field of Classification Search
USPC .......... 292/336.3, 56, 221, DIG. 31, DIG. 37, 292/DIG. 63, 92–94
See application file for complete search history.

(56) References Cited

U.S. PATENT DOCUMENTS

| | | | |
|---|---|---|---|
| 5,540,066 A | | 7/1996 | Takimoto |
| 6,419,284 B1 | * | 7/2002 | Kutschat .......................... 292/56 |
| 8,827,327 B2 | * | 9/2014 | Kutschat ............... E05B 85/247 292/196 |
| 2004/0113434 A1 | * | 6/2004 | Lane ........................ E05B 85/14 292/201 |
| 2005/0212307 A1 | | 9/2005 | Lane et al. |
| 2009/0091140 A1 | * | 4/2009 | Lane ............................... 292/56 |
| 2010/0045052 A1 | | 2/2010 | Kutschat |

FOREIGN PATENT DOCUMENTS

| | | |
|---|---|---|
| CN | 1661190 A | 8/2005 |
| CN | 101929279 A | 12/2010 |

(Continued)

*Primary Examiner* — Mark Williams
(74) *Attorney, Agent, or Firm* — Drinker Biddle & Reath LLP

(57) ABSTRACT

A fixture is attached to a hollow tube and has a pair of shafts protruding in a width direction. A handle has a base portion and a grip portion located at an end on the outside of the base portion. The base portion has a pair of side portions sandwiching both side surfaces of the fixture. The pair of side portions each have a hole receiving corresponding one of the pair of shafts. A restriction portion of a displacement preventing plate restricts a movement of the side portions in the width direction in a portion of each of the side portions located between an end on the grip portion side of the fixture and an end on the hollow space side of the base portion.

8 Claims, 10 Drawing Sheets

(56) References Cited

FOREIGN PATENT DOCUMENTS

| | | | |
|---|---|---|---|
| EP | 1096086 | A2 | 5/2001 |
| GB | 2453408 | A | 4/2009 |
| JP | S58-50029 | Y2 | 11/1983 |
| JP | 6-10041 | Y2 | 3/1994 |

* cited by examiner

FIG.3
(A)
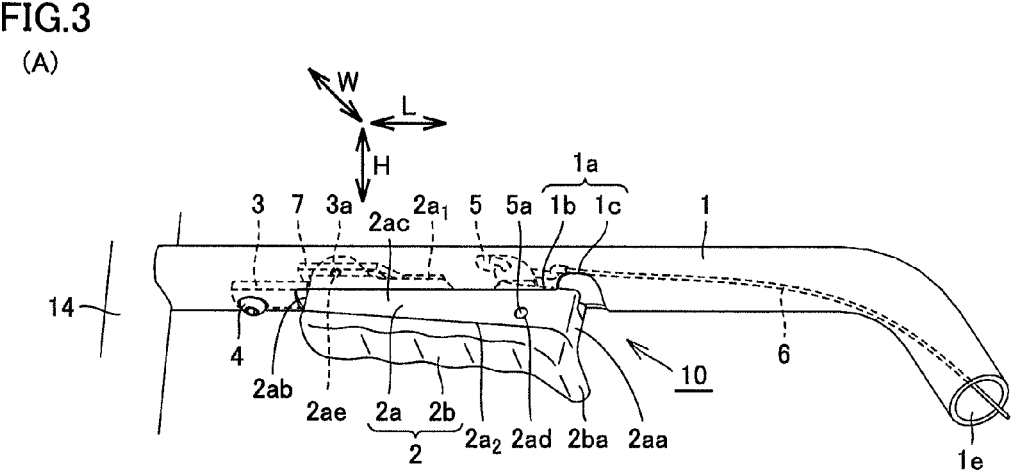
(B)
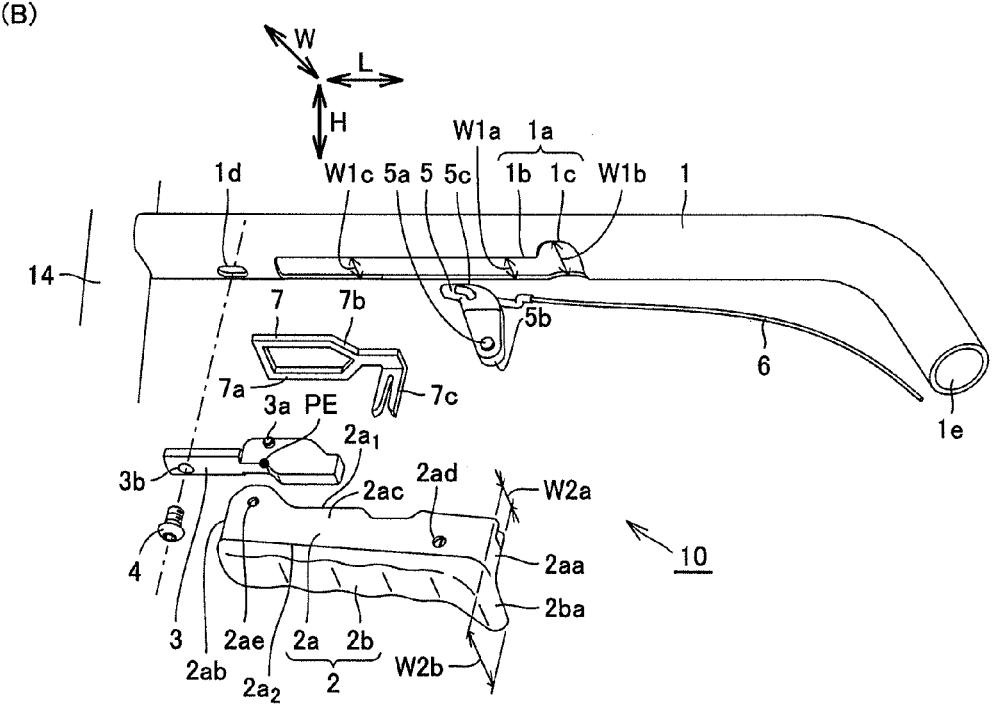

FIG.11
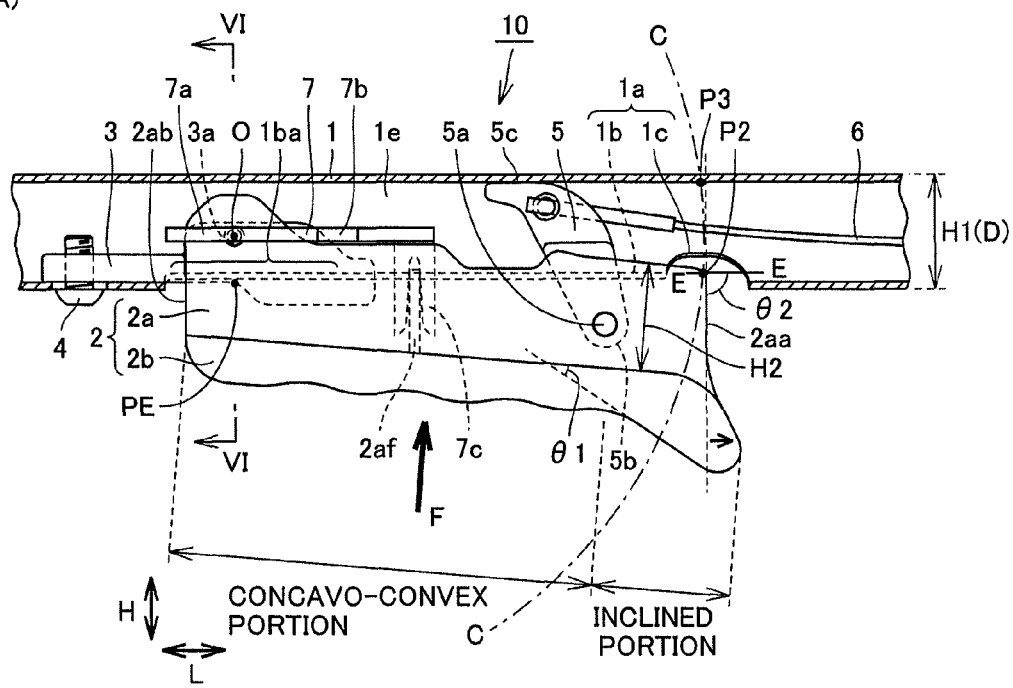
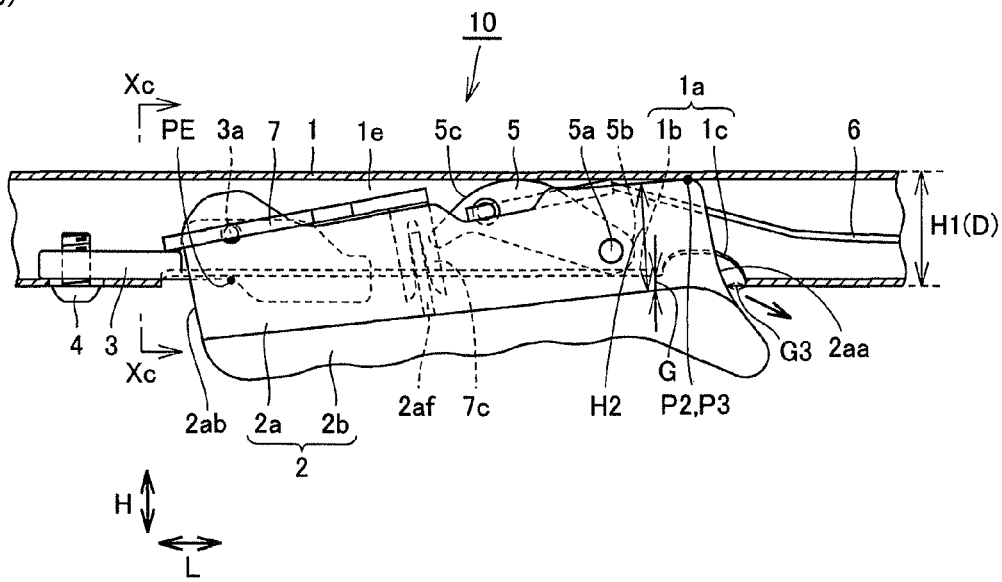
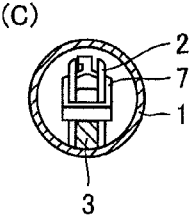

FIG.14
(A)
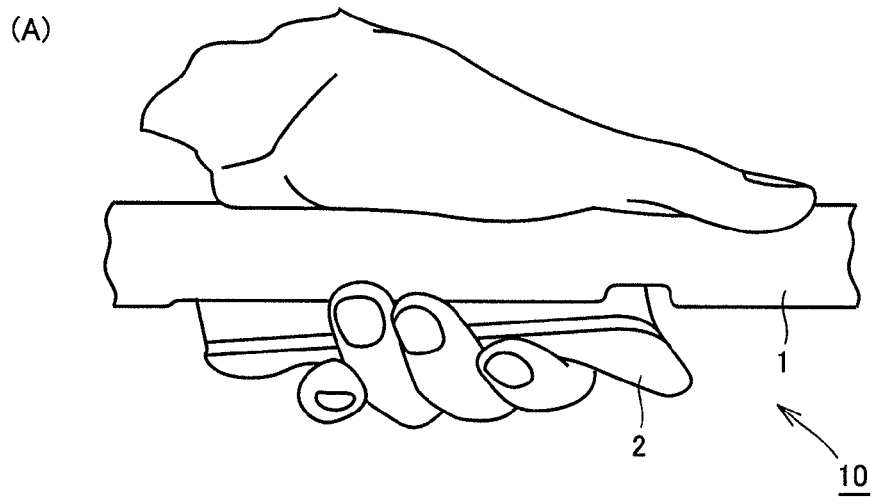
(B)
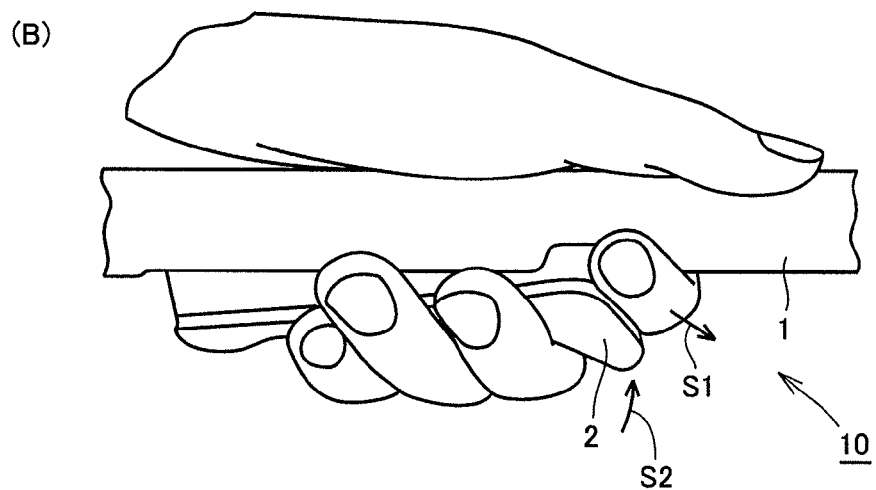
(C)
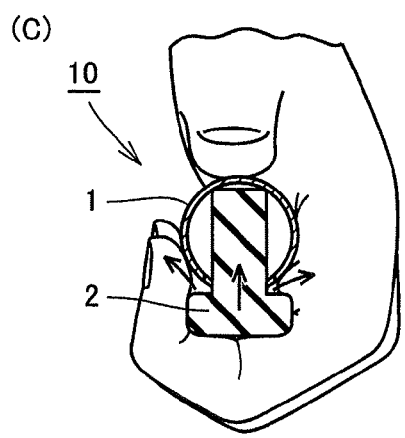

CAB FOR CONSTRUCTION MACHINE AND CONSTRUCTION MACHINE

TECHNICAL FIELD

The present invention relates to a cab for a construction machine and the construction machine, and particularly to a cab for a construction machine, specifically a cab including a door and a door opening and closing mechanism for opening and closing the door; and a construction machine including the cab for a construction machine.

BACKGROUND ART

A door handle of a working vehicle is disclosed in US Patent Publication No. 2010/0045052 (PTD 1), for example.

This US Patent publication No. 2010/0045052 discloses a door lock mechanism capable of releasing a door lock by an operator pushing a remote control button provided in a transverse tube from inside a vehicle such as an agricultural machine. Thereby, the operator can push the remote control button into the transverse tube by gripping the remote control button together with the transverse tube. Thus, unlocking of the door and the like can be achieved in a simple operation.

CITATION LIST

Patent Document

PTD 1: US Patent Publication No. 2010/0045052

SUMMARY OF INVENTION

Technical Problem

However, according to the above-described door lock mechanism, during operations such as unlocking of the door, the remote control button may receive force in the lateral direction (the direction crossing both of the longitudinal direction of the transverse tube and the direction in which the remote control button is pushed). When such force is applied to the remote control button, the shaft serving as the pivotal center of the remote control button may be displaced from the recess receiving the shaft.

The present invention has been made in light of the above-described problems. An object of the present invention is to provide a cab for a construction machine, specifically a cab allowing a door to be opened and closed in a simple operation and capable of preventing a shaft serving as the pivotal center of the handle from being displaced from a recess receiving the shaft during an operation; and a construction machine including the cab for a construction machine.

Solution to Problem

A cab for a construction machine of the present invention includes a door and a door opening and closing mechanism for opening and closing the door. The door opening and closing mechanism includes a hollow tube, a shaft support portion, a handle, and a restriction member. The hollow tube has a hollow space therein and a hole connecting the hollow space to outside. The shaft support portion is attached to the hollow tube, and has a pair of shafts protruding from both of side surfaces, respectively, facing each other in a width direction. The handle has a base portion and a grip portion at an end on the outside of the base portion, and is movable in a direction in which the handle is pushed into the hollow space. The base portion has a pair of side portions sandwiching both of the side surfaces of the shaft support portion, and the pair of side portions each have a recess receiving corresponding one of the pair of shafts. The restriction member restricts a movement of the base portion in the width direction between an end on the grip portion side of the shaft support portion and an end on the hollow space side of the base portion.

According to the cab for a construction machine of the present invention, the restriction member restricts the movement of the base portion in the width direction between the end on the grip portion side of the shaft support portion and the end on the hollow space side of the base portion. Accordingly, when the force in the width direction is applied to the grip portion of the handle, the end of each side portion of the base portion tends to rotate in the width direction about the end on the grip portion side of the shaft support portion. This rotation however can be restricted by the restriction member. Thereby, the shafts are prevented from being displaced from the recesses in the side portions of the base portion.

Furthermore, since the shafts are received in the recesses in the side portions of the base portion, the handle can be pivoted about the shafts between the hollow space side and the outside. Consequently, the operator can open and close the door in such a simple operation as gripping both of the hollow tube and the handle and pushing the handle into the hollow space.

In the above-described cab for a construction machine, the base portion has an extension portion extending in a direction opposite to the grip portion with respect to the shafts. The restriction member restricts the movement of the base portion in the width direction in the extension portion. Accordingly, the shafts are effectively prevented from being displaced from the recesses in the side portions of the base portion.

In the above-described cab for a construction machine, the restriction member restricts the movement of the base portion in the width direction at least in the recess. Accordingly, the shafts are more effectively prevented from being displaced from the recesses in the side portions of the base portion.

In the above-described cab for a construction machine, the restriction member has a portion that is decreased in width with an increase in distance from the shafts in a longitudinal direction of the hollow tube. Accordingly, even if the restriction member pivots within the hollow tube together with the handle, it becomes possible to suppress that a portion of the restriction member that is located at a distance from the shafts interferes with the inner wall of the hollow tube.

In the above-described cab for a construction machine, the handle has a rib disposed between the pair of side portions. The restriction member has a restriction portion restricting the movement of the base portion in the width direction and a support portion connected to the restriction portion and supported by the rib of the handle. Accordingly, the restriction member can be supported by the handle with the rib interposed therebetween.

In the above-described cab for a construction machine, the support portion has a notch portion formed to sandwich the rib. The notch portion has a tapered shape or a round shape so as to have an opening that is decreased in width with an increase in distance from an open end of the notch portion. Accordingly, the rib can be readily inserted from the open end of the support portion while the rib can be firmly fixed to the notch portion as the rib is inserted into the notch portion.

In the above-described cab for a construction machine, the support portion is in contact with at least one of the pair of side portions of the base portion. Accordingly, the restriction member can be installed in the handle while the support portion is in contact with the pair of the side portions of the base portion.

A construction machine of the present invention includes the cab for a construction machine described in any of the above.

According to the cab for a construction machine of the present invention, the door can be opened and closed in a simple operation, and the shafts each serving as the pivotal center of the handle can be prevented from being displaced from the recesses receiving the shafts during the operation.

Advantageous Effects of Invention

According to the present invention as described above, it becomes possible to implement a cab for a construction machine, specifically a cab allowing a door to be opened and closed in a simple operation and capable of preventing a shaft serving as the pivotal center of the handle from being displaced from a recess receiving the shaft during the operation; and a construction machine including the cab for a construction machine.

BRIEF DESCRIPTION OF DRAWINGS

FIG. 3 shows a perspective view (A) and an exploded perspective view (B) each illustrating the enlarged configuration of a door opening and closing mechanism of the cab shown in FIG. 2.

FIG. 11 is a diagram showing the operation of the door opening and closing mechanism of the cab shown in FIG. 2, including a partially cutaway side view (A) showing the state before the handle is pushed into the hollow space, a partially cutaway side view (B) showing the state where the handle has been pushed into the hollow space, and a schematic cross-sectional view (C) taken along the line Xc-Xc in FIG. 11(B).

FIG. 14 is a diagram showing the state where an operator operates the door opening and closing mechanism of the cab shown in FIG. 2, including a side view (A) showing the state where an index finger is put on a grip portion of the handle during the operation, a side view (B) showing the state where an index finger is put on one end of the base portion during the operation, and a cross-sectional view (C) showing the state during the operation.

DESCRIPTION OF EMBODIMENTS

The embodiments of the present invention will be hereinafter described with reference to the accompanying drawings.

The configuration of a wheel loader will be first described with reference to FIG. 1 as an example of a construction machine in the first embodiment of the present invention. The present invention is applicable to a construction machine, such as a hydraulic excavator and a bulldozer, provided with a cab having a door opening and closing mechanism.

Figure 1:
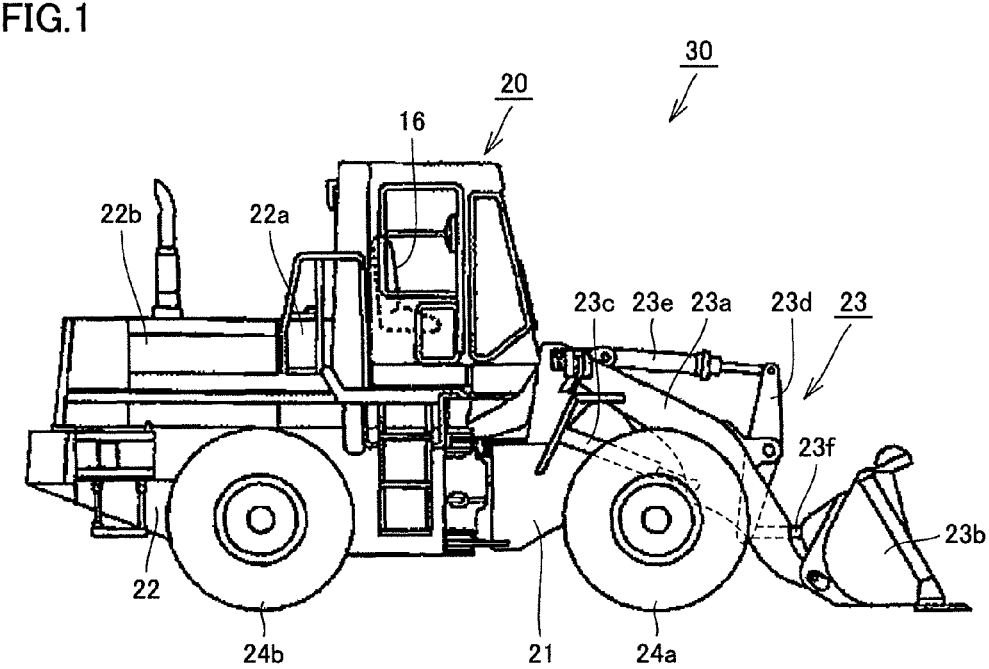
FIG. 1 is a side view schematically showing the configuration of a wheel loader in one embodiment of the present invention.

Referring to FIG. 1, a wheel loader 30 of the present embodiment mainly includes a front frame 21, a rear body 22 and an operating machine 23. To each lateral side of front frame 21, a front wheel 24a is attached. To each lateral side of rear body 22, a rear wheel 24b is attached.

Front frame 21 and rear body 22 are attached to each other by a center pin (not shown) in such a manner that allows them to laterally swing relative to each other, and thus form an articulated structure. Specifically, front frame 21 and rear body 22 are coupled together by a pair of right and left steering cylinders (not shown). The right and left steering cylinders are extended and shortened to allow front frame 21 and rear body 22 to laterally swing relative to each other about the center pin and steer. These front frame 21 and rear body 22 constitute the body of wheel loader 30.

To the front side of front frame 21, operating machine 23 is attached. Operating machine 23 includes a boom 23a having its base end attached to front frame 21 in such a manner that allows boom 23a to swing, and a bucket 23b attached to the leading end of boom 23a in such a manner that allows bucket 23b to swing. Front frame 21 and boom 23a are coupled together by a pair of boom cylinders 23c. The pair of boom cylinders 23c are extended and shortened to allow boom 23a to swing.

Operating machine 23 also includes: a bell crank 23d supported, at a substantially central position of the operating machine, on boom 23a in such a manner that allows bell crank 23d to swing; a bucket cylinder 23e coupling the base end of bell crank 23d and front frame 21 together; and a link 23f coupling the leading end of bell crank 23d and bucket 23b together. Bucket cylinder 23e is extended and shortened to allow bucket 23b to swing.

In a rear portion of rear body 22, an engine room 22b is disposed. On the front side with respect to engine room 22b, a hydraulic oil tank 22a is disposed. A cab 20 is provided on the front side with respect to hydraulic oil tank 22a for accommodating an operator so that the operator in the cab can operate wheel loader 30.

Next, a description will be given, using FIG. 2, of a configuration of a cab 20 for a construction machine according to an embodiment of the present invention, specifically a cab 20 used for wheel loader 30 of FIG. 1.

Figure 2:
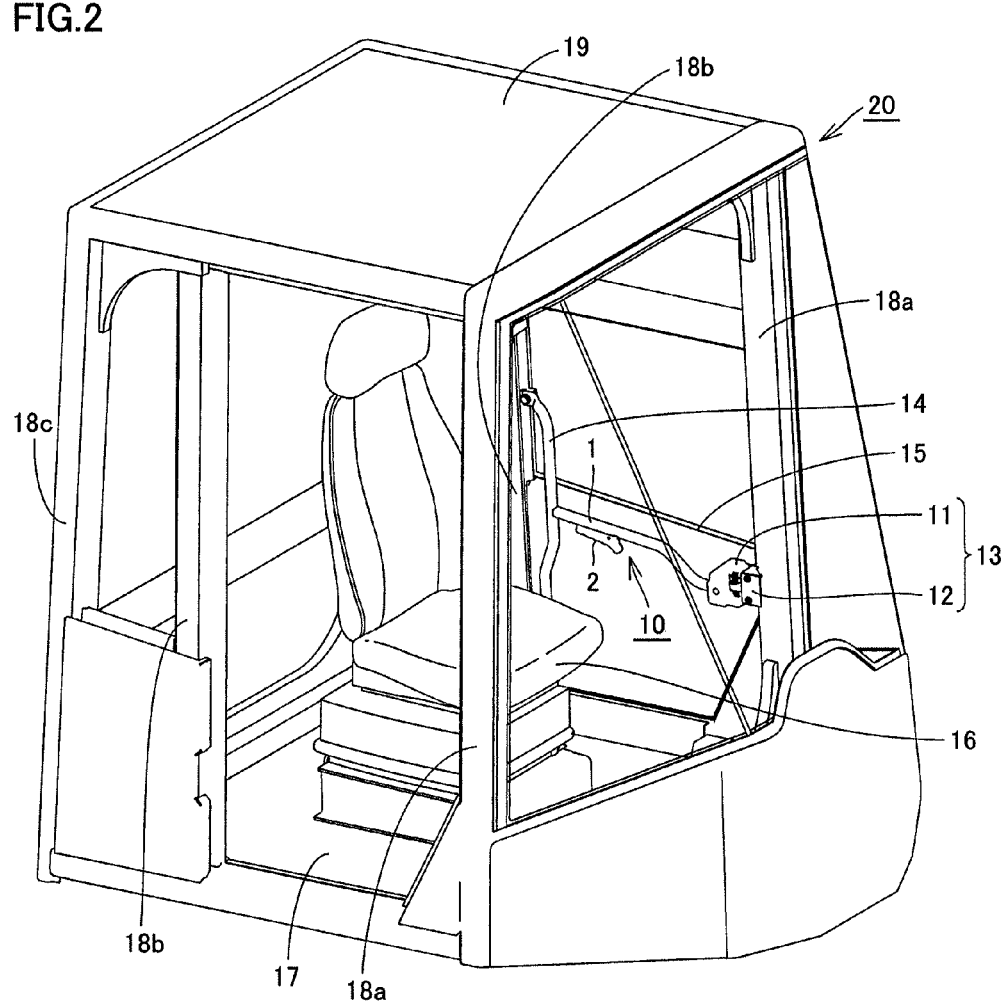
FIG. 2 is a perspective view schematically showing the configuration of a cab of the wheel loader shown in FIG. 1.

Referring to FIG. 2, cab 20 according to the present embodiment mainly includes a door opening and closing mechanism 10, a door 15, a driver's seat 16, a floor plate 17, a pair of front pillars 18a, a pair of center pillars 18b, a pair of rear pillars 18c, and a roof 19.

The pair of front pillars 18a, the pair of center pillars 18b and the pair of rear pillars 18c are vertically arranged on floor plate 17. Each of these pillars 18a, 18b and 18c has an upper end on which roof 19 is supported.

Driver's seat 24 for an operator to sit is disposed in a space surrounded by floor plate 17, each of pillars 18a, 18b and 18c, and roof 19. Door 15 is disposed on the side of driver's seat 16 (in the width direction of the vehicle body) and between front pillar 18a and center pillar 18b. This door 15 is used for an operator to go in and out of cab 20, and attached to cab 20 so as to be openable and closable.

Door opening and closing mechanism 10 for opening and closing door 15 is attached to door 15 and front pillar 18a. Door opening and closing mechanism 10 mainly includes a lock assembly 13 having a catcher 11 and a striker 12, a hollow tube 1, and a handle 2.

Hollow tube 1 has one end connected to catcher 11 and the other end connected to a tube 14 extending in the vertical direction with respect to the vehicle body. This tube 14 is attached to door 15 at both ends. Catcher 11 has a hook (not shown) that can be engaged with a bar member (not shown) of striker 12.

Handle 2 is attached to hollow tube 1. This handle 2 is pushed toward hollow tube 1, thereby allowing disengagement between the hook of catcher 11 and the bar member of striker 12, so that door 15 can be opened.

Then, the attachment structure for the hollow tube and the handle will be hereinafter described with reference to FIGS. 3(A) and 3(B).

Referring to FIGS. 3(A) and 3(B), the above-mentioned door opening and closing mechanism 10 further includes a fixture (shaft support portion) 3, a bolt 4, a pivotal portion 5, a wire 6, and a displacement preventing plate (restriction member) 7 in addition to hollow tube 1 and handle 2.

Hollow tube 1 is formed in the shape of a pipe having a hollow space 1e therein and, for example, formed in the shape of a round pipe with a circular cross section. This hollow tube 1 has a hole 1a connecting hollow space 1e to outside.

Handle 2 has a base portion 2a and a grip portion 2b. Base portion 2a and grip portion 2b are integrally formed and, for example, formed integrally by resin molding. Base portion 2a extends from outside of hollow tube 1 through hole 1a into hollow space 1e. This base portion 2a has an end 2a1 on the hollow space side and an end 2a2 on the outside facing each other in the height direction of handle 2 (in the direction indicated by an arrow H in the figure).

Base portion 2a also has a pair of side portions 2ac facing each other in the width direction of handle 2 (in the direction indicated by an arrow W in the figure). The pair of side portions 2ac face each other so as to be in parallel between end 2a1 on the hollow space side and end 2a2 on the outside.

Base portion 2a extending in the longitudinal direction of hollow tube 1 (in the direction indicated by an arrow L in the figure) has one end 2aa and the other end 2ab, in which a hole 2ad is provided in each of the pair of side portions 2ac on the one end 2aa side while a hole 2ae is provided in each of the pair of side portions 2ac on the other end 2ab side.

In addition, the longitudinal direction L corresponds to the shaft direction of hollow tube 1. Furthermore, the width direction W extends in the direction orthogonal to the longitudinal direction L. The height direction H extends in the direction orthogonal to both of the longitudinal direction L and the width direction W.

Grip portion 2b is located at end 2a2 on the outside in base portion 2a and brought into contact with the operator's finger when the operator performs a door opening and closing operation. Accordingly, on the surface of grip portion 2b on the side opposite to base portion 2a, a gentle wave-like concavo-convex portion is formed on which four fingers (an index finger, a middle finger, a third finger, and a little finger) are placed. Furthermore, in the forward part of grip portion 2b, an inclined portion is formed such that the more it extends in the forward direction, the farther it is away from hollow tube 1. Consequently, it becomes possible for the operator to recognize the position of his/her finger with respect to grip portion 2b without visually confirming the handle, and also possible to suppress displacement of the above-mentioned four fingers from grip portion 2b during the operation of opening and closing door 15 (FIG. 2).

The above-described handle 2 is supported by hollow tube 1 so as to be movable in the direction in which this handle is pushed at least toward hollow space 1e, and specifically configured as described below.

First, fixture 3 is disposed within hollow space 1e of hollow tube 1. A bolt 4 penetrates through an insertion hole 1d of hollow tube 1, and is screwed into a screw hole 3b of fixture 3. This allows fixture 3 to be fixed by bolt 4 to hollow tube 1 within hollow space 1e.

This fixture 3 has a pair of shafts 3a protruding from each of its lateral surfaces in the lateral direction (width direction W). If hollow tube 1 is for example a round pipe, the pair of shafts 3a extend, for example, in the direction parallel to the tangent line of the outer peripheral surface of hollow tube 1 in the state where fixture 3 is attached to hollow tube 1.

Fixture 3 is disposed between the pair of side portions 2ac of base portion 2a. Furthermore, the pair of shafts 3a are inserted into the pair of holes 2ae (recesses), respectively, of base portion 2a. Accordingly, handle 2 is pivotable about the pair of shafts 3a with respect to hollow tube 1 and supported by hollow tube 1 so as to be movable in the direction in which handle 2 is pushed toward hollow space 1e and in the direction opposite thereto.

Furthermore, the above-described handle 2 is configured such that it can operate, for example, to pull wire 6 connected to catcher 11 (FIG. 2) by the above-described moving operation (for example, a pivotal movement operation), as will be specifically described below.

First, pivotal portion 5 is disposed between the pair of side portions 2ac of base portion 2a. Pivotal portion 5 is provided on its one end 5b side with a pair of shafts 5a protruding from each lateral side of this pivotal portion 5 in the lateral direction. The pair of shafts 5a are inserted into the pair of holes tad, respectively, of base portion 2a, and arranged to extend in the width direction W of handle 2. Accordingly, pivotal portion 5 is pivotable about the pair of shafts 5a with respect to handle 2.

Wire 6 is attached to this pivotal portion 5 on its other end 5c side, and extends through hollow space 1e of hollow tube 1 to catcher 11 (FIG. 2). This pivotal portion 5 pivots with respect to handle 2, thereby allowing such an operation as pulling wire 6, and the like.

A displacement preventing plate 7 serves to restrict the movement of side portions 2ac of base portion 2a in the width direction W. This displacement preventing plate 7 is attached to handle 2.

Then, an explanation will be given with regard to the structure of displacement preventing plate 7 and attachment of displacement preventing plate 7 to handle 2 with reference to FIGS. 4 to 9.

Figure 4:
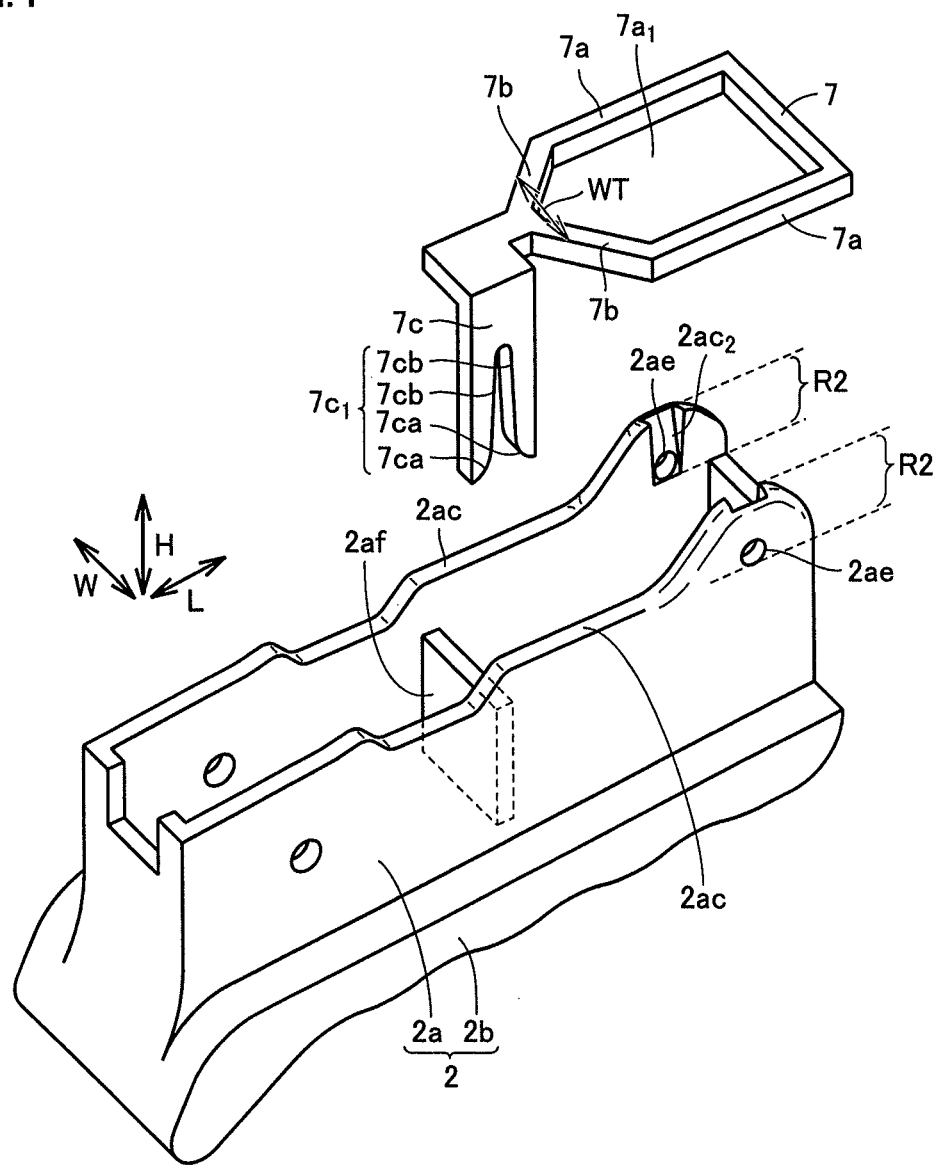
FIG. 4 is an exploded perspective view schematically showing the configurations of a handle and a displacement preventing plate shown in FIG. 3.

Referring to FIG. 4, displacement preventing plate 7 mainly includes a pair of restriction portions 7a, a pair of tapered portions 7b, and a support portion 7c. The pair of restriction portions 7a linearly extend in the longitudinal direction L so as to be parallel to each other with a gap 7a1 interposed therebetween.

The pair of tapered portions 7b each have one end connected to the corresponding one of the pair of restriction portions 7a. The pair of tapered portions 7b linearly extend from their one ends so as to come close to each other at their other ends. The other ends of the pair of tapered portions 7b are connected to each other. Accordingly, a width WT (a dimension WT in the width direction W) of displacement preventing plate 7 in the pair of tapered portions 7b is decreased with an increase in distance from hole (recess) 2ae (shaft 3a: FIGS. 3(A) and 3(B)).

Support portion 7c has one end connected to the other ends of the pair of tapered portions 7b. Support portion 7c extends in the height direction H from its one end side toward its other end. Support portion 7c is provided on its other end with a notch portion 7c1 so as to be opened. Thereby, the other end side of support portion 7c is configured in a bifurcated shape. Two portions forming this bifurcated shape of support portion 7c are arranged so as to extend in the longitudinal direction L.

This notch portion 7c1 is formed so as to extend in the height direction H in support portion 7c from its other end to its one end. Notch portion 7c1 is formed in a tapered shape or a round shape so as to have an opening that is decreased in width with an increase in distance from its open end.

Specifically, notch portion 7c1 has an open end 7ca located at the other end of support portion 7c and an extension portion 7cb extending from open end 7ca toward one end of support portion 7c. This open end 7ca has a tapered shape or a round shape having an opening that is decreased in width with an increase in distance from the open end of notch portion 7c1. Furthermore, extension portion 7cb has a tapered shape having an opening that is decreased in width with an increase in distance from open end 7ca.

When open end 7ca is formed in a tapered shape, this tapered shape of open end 7ca is greater in inclination angle to the height direction H, and thus, greater in extent of the width of the opening, than the tapered shape of extension portion 7cb.

It is preferable that this displacement preventing plate 7 is made of metal, but may be made of a material such as a resin with high hardness. Displacement preventing plate 7 may be configured by bending one flat plate such that restriction portion 7a, tapered portion 7b and support portion 7c are integrally formed, or by attaching support portion 7c to tapered portion 7b by welding, adhesion or the like.

Figure 5:
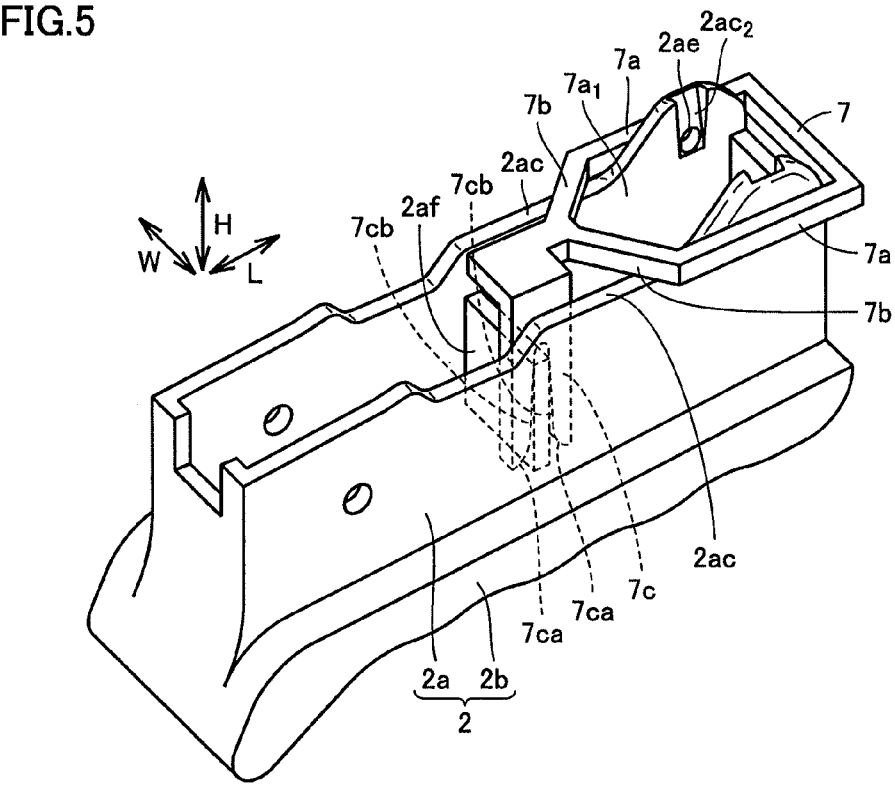
FIG. 5 is an assembly perspective view schematically showing the configurations of the handle and the displacement preventing plate shown in FIG. 4.

Referring to FIG. 5, displacement preventing plate 7 is attached to handle 2. In this attached state, the pair of restriction portions 7a are located on the outside of the pair of side portions 2ac, respectively, in the width direction W. In other words, the pair of restriction portions 7a sandwich the pair of side portions 2ac of base portion 2a in the width direction W.

Each of the pair of side portions 2ac has an extension portion R2 extending in the direction opposite, in height direction H, to grip portion 2b with respect to hole tae (shaft 3a: FIGS. 3(A) and 3(B)), as shown in FIG. 4. As shown in FIG. 5, the pair of restriction portions 7a are located, for example, on the outside of extension portions R2 of the pair of side portions 2ac in the width direction W.

Handle 2 has a rib 2af extending in the width direction W between the pair of side portions 2ac. This rib 2af is inserted into notch portion 7c1 of support portion 7c. Accordingly, displacement preventing plate 7 is positioned in handle 2 in the longitudinal direction L.

Figure 6:
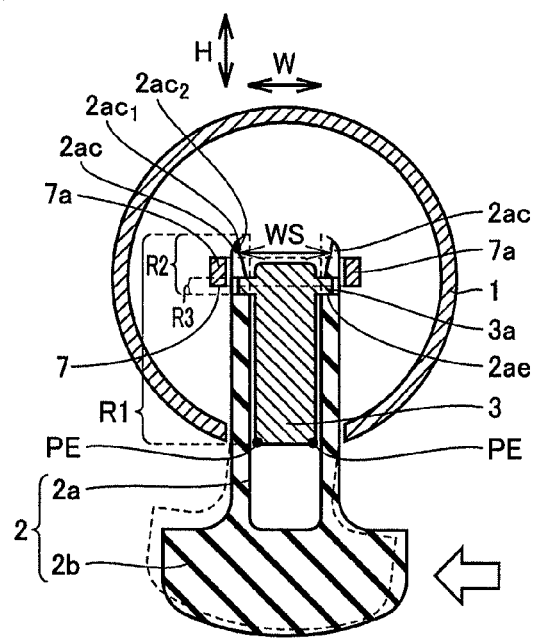
FIG. 6 is a schematic cross-sectional view taken along the line VI-VI in FIG. 11(A), illustrating the door opening and closing mechanism of the cab in one embodiment of the present invention, in which the shaft for supporting the handle so as to be pivotable is not displaced from a hole of the handle even if the force in the lateral direction is applied to the handle.

Referring to FIG. 6, the pair of restriction portions 7a are located, for example, on the outside of extension portions R2 of the pair of side portions 2ac in the width direction W, as described above. However, the pair of restriction portions 7a only have to be located on the outside of portions R1 of side portions 2ac in the width direction W that each are located between an end PE on the grip portion 2b side of fixture 3 and an end 2ac1 on the hollow space 1e side of side portion 2ac. Furthermore, the pair of restriction portions 7a may be located on the outside of the pair of side portions 2ac in the width direction W at a position R3 of hole 2ae in the height direction H (that is, at a position of shaft 3a in the height direction L).

Furthermore, it is preferable that end 2ac1 on the hollow space 1e side of each of the pair of side portions 2ac has a round shape on the outside in the width direction W. In other words, it is preferable that end 2ac1 of one of the pair of side portions 2ac has a round shape on the surface opposite to the side facing the other side portion 2ac. Consequently, displacement preventing plate 7 can be readily fitted in base portion 2a so as to sandwich the pair of side portions 2ac.

Also as shown in FIGS. 4 and 5, a groove 2ac2 extending from hole 2ae in the height direction H may be provided on the each of the side surfaces of one side portion 2ac and the other side portion 2ac that face each other. As shown in FIG. 6, due to this groove 2ac2, a distance (width) WS between the pair of side portions 2ac is increased with an increase in distance from grip portion 2b in the height direction H. In other words, the pair of side portions 2ac each are provided with a tapered portion by groove 2ac2 such that distance WS between the pair of side portions 2a is increased with an increase in distance from grip portion 2b in the height direction H. This allows shaft 3a to be readily fitted in hole 2ae, so that assembly can be facilitated.

Figure 7:
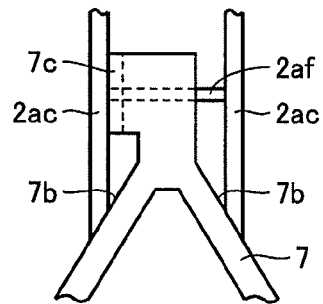
FIG. 7 is a plan view schematically showing the configuration in which a support portion of the displacement preventing plate is in contact with only one of a pair of side portions of a base portion of the handle.

Referring to FIG. 7, it is preferable that support portion 7c of displacement preventing plate 7 is in contact with one of the pair of side portions 2ac in the state where displacement preventing plate 7 is attached to handle 2 as seen in plan view. Accordingly, when displacement preventing plate 7 is attached to handle 2, it becomes possible to attach displacement preventing plate 7 to handle 2 while support portion 7c is in contact with one of side portions 2ac. Consequently, displacement preventing plate 7 can be readily positioned in handle 2 and attached to handle 2.

Figure 8:
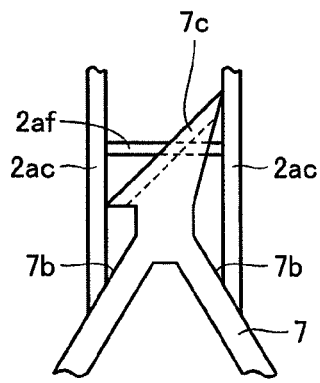
FIG. 8 is a plan view of a modification of the displacement preventing plate, which schematically shows the configuration in which the support portion of the displacement preventing plate is in contact with both of the pair of side portions of the base portion of the handle.
Figure 9:
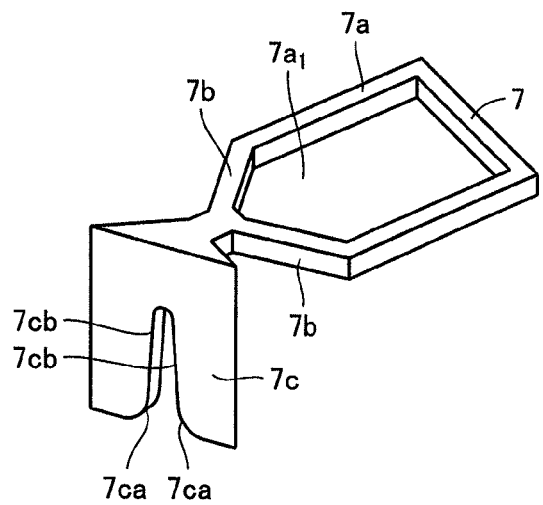
FIG. 9 is a perspective view schematically showing the configuration of the displacement preventing plate shown in FIG. 8.

Referring to FIGS. 8 and 9, support portion 7c of displacement preventing plate 7 may be in contact with both of the pair of side portions 2ac in the state where displacement preventing plate 7 is attached to handle 2 as seen in plan view. Accordingly, when displacement preventing plate 7 is attached to handle 2, it becomes possible to attach displacement preventing plate 7 to handle 2 while support portion 7c is in contact with both of the pair of side portions 2ac. Consequently, displacement preventing plate 7 can be more readily positioned in handle 2 and attached to handle 2.

Then, the shape of hole 1a of hollow tube 1, a dimension of each part and the like will be described with reference to FIG. 10.

Figure 10:
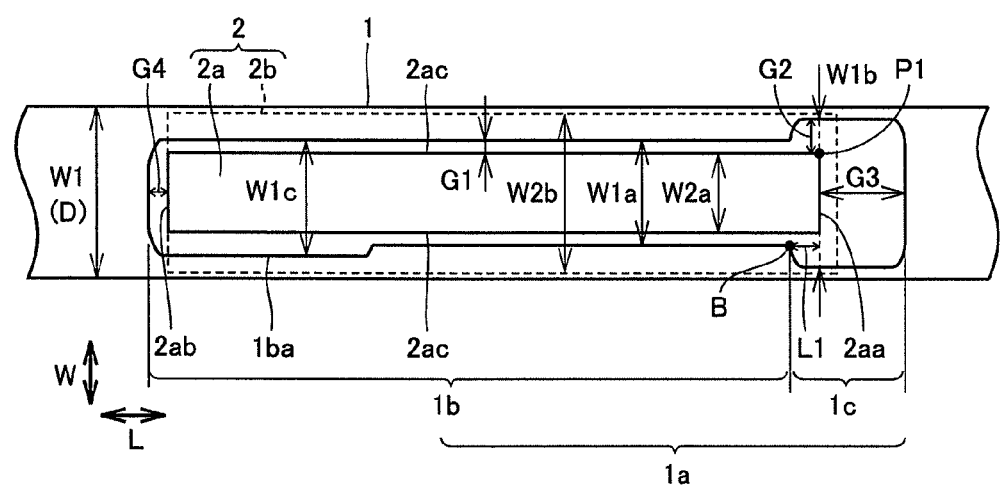
FIG. 10 is a diagram for illustrating dimensions of a hole of a hollow tube and a base portion and a grip portion of the handle in the door opening and closing mechanism of the cab shown in FIG. 2.

Referring to FIG. 10, hole 1a has a first hole portion 1c and a second hole portion 1b. First hole portion 1c is located at one end 2aa of base portion 2a extending in the longitudinal direction L of hollow tube 1. Second hole portion 1b is located to extend from one end of this first hole portion 1c toward the portion corresponding to the other end 2ab of base portion 2a.

A dimension W2b of grip portion 2b of handle 2 in the width direction W is greater than a dimension W2a of base portion 2a in the width direction W and greater than a dimension W1a of second hole portion 1b in the width direction W.

Furthermore, a dimension W1b of first hole portion 1c in the width direction W is greater than a dimension W1a of second hole portion 1b in the width direction W. Accordingly, a dimension G2 in the width direction W of a gap between a corner portion P1 at one end 2aa of base portion 2a and first hole portion 1c is greater than a dimension G1 in the width direction W of a gap between a side surface 2ac of base portion 2a and second hole portion 1b. Furthermore, a dimension W2b of grip portion 2b in the width direction W is smaller than a dimension W1 (for example, a diameter D) of hollow tube 1 in the width direction W. It is to be noted that a boundary B between first hole portion 1c and second hole portion 1b is located closer to the other end 2ab of base portion 2a by a prescribed length L1 from one end 2aa thereof. It is preferable that dimension W2b is equal to or greater than dimension W1b.

Furthermore, a dimension G3 in the longitudinal direction L of the gap between one end 2aa of base portions 2a and the end of first hole portion 1c on the side opposite to the other end 2ab is greater than a dimension G4 in the longitudinal direction L of the gap between the other end 2ab of base portion 2a and the end of second hole portion 1b on the side opposite to one end 2aa. Insertion hole 1d as mentioned above is a long hole. Accordingly, even if the position of the handle is adjusted backward and forward (in the L direction), dimension G3 in the longitudinal direction L of the gap between one end 2aa of base portions 2a and the end of first hole portion 1c on the side opposite to the other end 2ab can be maintained at a prescribed gap.

Furthermore, on the other end side of second hole portion 1b in the longitudinal direction L, a wide-width portion 1ba increased in width of second hole portion 1b may be formed. Accordingly, a dimension W1c in the width direction W of second hole portion 1b in which wide-width portion 1ba is formed is greater than a dimension W1a in the width direction W of second hole portion 1b in which wide-width portion 1ba is not formed. By providing this wide-width portion 1ba, handle 2 can be readily installed in hollow tube 1.

Next, the operation of door opening and closing mechanism 10 in the present embodiment will be described with reference to FIGS. 11(A) to 11(C). FIG. 11(C) is a schematic cross-sectional view taken along the line Xc-Xc in FIG. 11(B).

Referring to FIG. 11(A), in the state before handle 2 is pushed toward hollow space 1e of hollow tube 1, handle 2 is not in contact with the inner peripheral surface of hollow tube 1. In other words, a portion P2 at one end 2aa of base portion 2a located closest to hollow space 1e is spaced apart from a portion P3 on the inner peripheral surface of hollow tube 1 that intersects the pivotal movement path (an alternate long and short dashed line C-C) of this portion P2. Also in this state, the other end 5c of pivotal portion 5 is in contact with the inner peripheral surface of hollow tube 1.

When an operator grips both of hollow tube 1 and handle 2 in this state, handle 2 is applied with force in the direction indicated by a thick arrow F in the figure. By this force applied in the direction F, handle 2 pivots about shafts 3a as center O in the direction in which handle 2 is pushed toward hollow space 1e of hollow tube 1.

Referring to FIGS. 11(B) and 11(C), by the above-described operation, handle 2 pivots until portion P2 of base portion 2a is brought into contact with portion P3 on the inner peripheral surface of hollow tube 1. In this case, pivotal portion 5 pivots about shafts 5a with respect to handle 2. By this pivotal movement of pivotal portion 5, the other end 5c of pivotal portion 5 slides toward the other end 2ab in the longitudinal direction L (to the left in the figure) while being kept in contact with the inner peripheral surface of hollow tube 1. Thereby, wire 6 attached to pivotal portion 5 on the other end 5c side is pulled toward the other end 2ab in the longitudinal direction L. This allows disengagement between the hook of catcher 11 and the bar member of striker 12 that are shown in FIG. 2, so that door 15 can be opened.

The preferable configuration of door opening and closing mechanism 10 in the present embodiment will then be described with reference to FIGS. 11(A) to 11(C) and FIG. 12.

Figure 12:
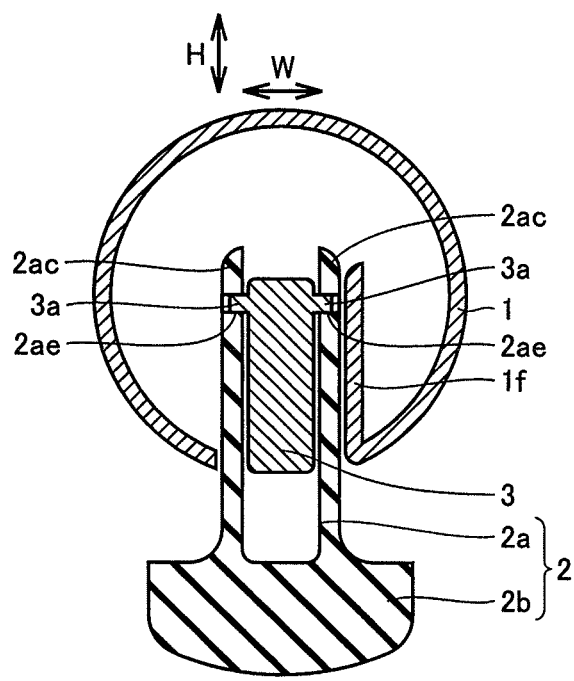
FIG. 12 is a cross-sectional view schematically showing the configuration in which the movement of the base portion of the handle in the width direction is restricted by a part of the hollow tube.

Referring to FIG. 12, although the above description has been made with regard to the configuration in which displacement preventing plate 7 provided independently of hollow tube 1 is employed for restricting the movement of side portions 2ac of base portion 2a in the width direction W, the portion for restricting the movement of side portions 2ac in the width direction W may be integrally formed with hollow tube 1. For example, a folded portion 1f may be formed by folding an edge of hole 1a of hollow tube 1 toward the inside of hollow space 1e of hollow tube 1 so that the movement of side portions 2ac in the width direction W may be restricted by this folded portion 1f.

Referring to FIG. 11(B), handle 2 is configured such that, in the state where handle 2 is pushed maximally toward hollow space 1e, a gap G occurs between grip portion 2b and hollow tube 1 at the portion where grip portion 2b and hollow tube 1 come closest to each other. Furthermore, handle 2 is configured such that a gap G3 occurs also in front of the front end of handle 2 in the state where handle 2 is pushed maximally toward hollow space 1e.

Referring to FIG. 11(A), in order to produce the above-mentioned gap G, specifically, a height H2 of base portion 2a at a portion where grip portion 2b and hollow tube 1 come closest to each other (a dimension H2 of base portion 2a from the end on the hollow space 1e side to the end on the outside of hollow tube 1) is greater than a dimension H1 of hollow tube 1 in the height direction H (for example, diameter D).

One end 2aa of base portion 2a is inclined so as to be farther away from the pivotal center O of handle 2 (shafts 3a) as coming closer to grip portion 2b. Specifically, it is assumed that an imaginary curve C-C extends at a distance from pivotal center O, which is equal to the distance from pivotal center O to portion P2 at one end 2aa of base portion 2a that is located closest to hollow space 1e. In this case, one end 2aa of base portion 2a is inclined so as to be farther away from this imaginary curve C-C in the radial direction around pivotal center O as coming closer to grip portion 2b from the above-mentioned portion P2.

Furthermore, in the state before handle 2 is pushed toward hollow space 1e, one end 2aa of base portion 2a is preferably inclined at an angle θ2 of less than 90° with respect to an imaginary straight line E-E extending in the longitudinal direction L.

Grip portion 2b also has an inclined portion located on base portion 2a on the one end 2aa side and a concavo-convex portion located on base portion 2a on the other end 2ab side.

This inclined portion is inclined so as to be farther away from hollow tube 1 as coming closer to one end 2aa of base portion 2a in the longitudinal direction L from the other end 2ab side. This inclined portion is inclined at an angle θ1 of less than 90° with respect to the boundary between base portion 2a and the concavo-convex portion of grip portion 2b.

Although the above description has been made with regard to hole 2ae passing through side portion 2ac as a portion receiving shaft 3a, the portion receiving shaft 3a may be a hole having a bottom not passing through side portion 2ac, or only has to be a recess including a though hole or a hole having a bottom.

Then, the functions and effects of the present embodiment will be described.

In the present embodiment, as shown in FIG. 6, even when the force in the lateral direction W (the force indicated by an outlined arrow in the figure) is applied to handle 2, shaft 3a can be prevented from being displaced from hole 2ae, which will be hereinafter described as compared with a comparative example shown in FIG. 13.

Figure 13:
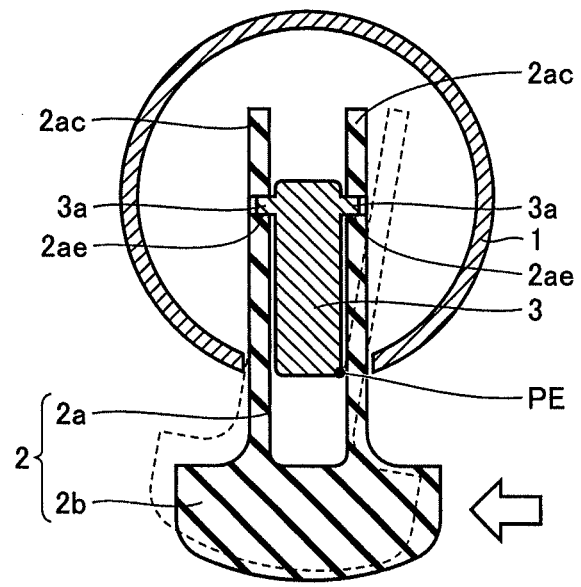
FIG. 13 is a schematic cross-sectional view of a comparative example showing the manner in which the shaft for supporting the handle so as to be pivotable is displaced from a hole of the handle when the force in the lateral direction is applied to the handle.

The configuration of the comparative example shown in FIG. 13 is different from the configuration of the present embodiment shown in FIG. 6 in the point that displacement preventing plate 7 is not provided. Since the configuration of the comparative example other than the above-mentioned point is almost the same as that of the present embodiment shown in FIGS. 3 to 6, the same components are denoted by the same reference characters, and a description thereof will not be repeated.

In the comparative example shown in FIG. 13, when an operator operates door opening and closing mechanism 10, the force in the lateral direction W (the force indicated by an outlined arrow in the figure) may be applied to handle 2. In this case, handle 2 tends to deform as indicated by a dashed line. When this deformation of handle 2 occurs, side portion 2ac of base portion 2a is brought into contact with end PE on the grip portion 2b side of fixture 3, and rotates about end PE.

By this rotation of side portion 2ac, shaft 3a is displaced from hole 2ae of side portion 2ac. Since impact noise is generated when shaft 3a is displaced from hole 2ae, the operator feels uneasy that some parts might be damaged. Also, when shaft 3a is repeatedly displaced form hole 2ae, degradation occurs in shaft 3a or hole 2ae.

In contrast, according to the present embodiment, as shown in FIG. 6, restriction portion 7a of displacement preventing plate 7 is located on the outside of portion R1 of side portion 2ac in the width direction W located between end PE on the grip portion 2b side of fixture 3 and end 2ac1 on the hollow space 1e side of side portion 2ac. This restriction portion 7a restricts the movement of side portion 2ac in the width direction W.

Accordingly, even if the force in the width direction W is applied to grip portion 2b of handle 2 as shown by an outlined arrow in the figure to force side portion 2ac of base portion 2a to rotate about end PE on the grip portion 2b side of fixture 3, this rotation can be restricted by restriction portion 7a. Accordingly, shaft 3a is prevented from being displaced from hole 2ae of side portion 2ac.

Furthermore, since shafts 3a are inserted into holes 2ae of side portions 2ac of base portion 2a as shown in FIGS. 11(A) and 11(B), handle 2 can be pivoted about these shafts 3a between the hollow space 1e side and the outside. Thereby, the operator can open and close the door in such a simple operation as holding both of hollow tube 1 and handle 2, and pushing handle 2 into hollow space 1e.

Furthermore, as shown in FIG. 6, base portion 2a has an extension portion R2 extending in the direction opposite to grip portion 2b with respect to shaft 3a, and restriction portion 7a restricts the movement of side portion 2ac in the width direction W in this extension portion R2. Accordingly, shaft 3a is effectively prevented from being displaced from hole 2ae of side portion 2ac.

Furthermore, as shown in FIG. 6, restriction portion 7a restricts the movement of side portion 2ac in the width direction W at least in a height position H of hole 2ae (shaft 3a). Accordingly, shaft 3a is more effectively prevented from being displaced from hole 2ae of side portion 2ac.

Furthermore, as shown in FIG. 4, displacement preventing plate 7 has a pair of tapered portions 7b so as to have width WT that is decreased with an increase in distance from shaft 3a in the longitudinal direction L of hollow tube 1. Consequently, as shown in FIGS. 11(B) and 11(C), even if displacement preventing plate 7 is pivoted within hollow tube 1 together with handle 2 when handle 2 is pushed into hollow space 1e, it is suppressed that displacement preventing plate 7 interferes with the inner wall of hollow tube 1.

Furthermore, as shown in FIG. 5, since displacement preventing plate 7 has support portion 7c, this support portion 7c allows displacement preventing plate 7 to be supported by rib 2af of handle 2.

Furthermore, as shown in FIG. 4, support portion 7c of displacement preventing plate 7 has notch portion 7c1 formed to sandwich rib 2af. This notch portion 7c1 has a tapered shape or a round shape having an opening that is decreased in width with an increase in distance from the open end of notch portion 7c1. Thereby, rib 2af can be readily inserted through the open end of support portion 7c while rib 2af can be firmly fixed to notch portion 7c1 as rib 2af is inserted deeply into notch portion 7c1.

Furthermore, as shown in FIGS. 7 and 8, support portion 7c of displacement preventing plate 7 is in contact with one (FIG. 7) or both (FIG. 8) of the pair of side portions 2ac. Accordingly, displacement preventing plate 7 can be installed in handle 2 while support portion 7c is in contact with side portion 2ac. Consequently, displacement preventing plate 7 can be readily positioned in handle 2 and installed in handle 2.

Furthermore, as shown in FIG. 10, dimension W2b of grip portion 2b in the width direction W is greater than dimension W2a of base portion 2a in the width direction W and greater than dimension W1a of second hole portion 1b in the width direction W. Accordingly, when the operator grips both of hollow tube 1 and handle 2 to push handle 2 into hollow space 1e as shown in FIG. 14(C), the operator's finger or palm is less likely to be inserted between grip portion 2b and hollow tube 1 because grip portion 2b has relatively greater width W2b. Consequently, the operator's finger or palm is less likely to get caught in the gap between base portion 2a of handle 2 and hole 1a of hollow tube 1.

Also as shown in FIG. 10, dimension W1b of first hole portion 1c in the width direction W is greater than dimension W1a of second hole portion 1b in the width direction W. In this way, dimension W1b of first hole portion 1c in the width direction W is set relatively greater, thereby allowing an increase in dimension G2 in the width direction W of the gap between corner portion P1 of base portion 2a at one end 2aa and first hole portion 1c in which the operator's finger is more likely to get caught. Consequently, it becomes possible to suppress the operator's finger from getting caught in this portion. Furthermore, dimension W1a of second hole portion 1b in the width direction W is set relatively smaller, thereby allowing a decrease in dimension G1 in the width direction W of the gap between base portion 2a and second hole portion 1b. Consequently, rattling of handle 2 against hollow tube 1 can be suppressed.

Furthermore, as shown in FIGS. 3(A), 3(B) and the like, hollow tube 1 is formed of a round pipe. Accordingly, when an operator grips both of hollow tube 1 and handle 2 as shown in FIG. 14(C), the operator's finger or palm can readily escape from between grip portion 2b and hollow tube 1 along the outer peripheral surface of hollow tube 1 formed of a round pipe, as indicated by an arrow in the figure. Thereby, the operator's finger or palm is further less likely to get caught in the gap between base portion 2a of handle 2 and hole 1a of hollow tube 1.

Also as shown in FIG. 10, dimension W2b of grip portion 2b in the width direction W is smaller than dimension W1 of hollow tube 1 in the width direction W. Accordingly, when the operator holds both of hollow tube 1 and handle 2 as shown in FIGS. 14(A), 14 (B) and 14 (C), the operator can easily grip handle 2.

Furthermore, in the state where handle 2 is pushed maximally toward hollow space 1e as shown in FIG. 11(B), there is a gap G between grip portion 2b and hollow tube 1 at the portion where grip portion 2b and hollow tube 1 come closest to each other. This prevents grip portion 2b and hollow tube 1 from being brought into contact with each other even in the state where handle 2 is pushed maximally toward hollow space 1e. Furthermore, handle 2 is configured such that gap G3 occurs also in front of the front end of handle 2 in the state where handle 2 is pushed maximally into hollow space 1e.

Also, as shown in FIG. 11(A), height H2 of base portion 2a from the end on the hollow space 1e side to the end on the outside of hollow space 1e is greater than dimension H1 of hollow tube 1 in the height direction H (for example, diameter D). This prevents grip portion 2b and hollow tube 1 from being brought into contact with each other even in the state where handle 2 is pushed maximally toward hollow space 1e.

Also as shown in FIG. 11(A), base portion 2a is supported by hollow tube 1 on the other end 2ab side in the longitudinal direction L so as to be pivotable, and one end 2aa of base portion 2a is inclined so as to be farther away from pivotal center O of handle 2 as coming closer to grip portion 2b. Accordingly, even when the finger (an index finger) is put on one end 2aa of base portion 2a to push handle 2 in the direction indicated by an arrow S2 in the figure as shown in FIG. 14(B), the more handle 2 is pushed into, the more the finger put on one end 2aa of this handle 2 is moved away from the pivotal center along the inclination of one end 2aa of base portion 2a in the direction indicated by an arrow S1 in the figure. In this way, since the finger moves so as to escape from the gap between base portion 2a and a hole of hollow tube 1 extending in the longitudinal direction L of base portion 2a, the finger is less likely to get caught in the gap.

Furthermore, as shown in FIG. 11(A), grip portion 2b is provided at one end with an inclined portion formed so as to be farther away from hollow tube 1 as it extends toward one end 2aa from the other end 2ab side. Because of this inclined portion provided at one end, the operator can recognize the position of his/her index finger with respect to grip portion 2b of handle 2 without visual confirmation. Furthermore, when the inclined portion at one end located farthest away from the other end serving as pivotal center O is pushed toward the hollow space by using an index finger, it becomes possible to operate the handle with relatively less operating force.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 hollow tube, 1a hole, 1b second hole portion, 1ba wide-width portion, 1c first hole portion, 1d insertion hole, 1e hollow space, 2 handle, 2a base portion, 2a1 end on the hollow space side, 2a2 end on the outside, 2aa, 5b one end, 2ab, 5c the other end, 2ac side portion, 2ad, 2ae hole, 2b grip portion, 3 fixture, 3a, 5a shaft, 3b screw hole, 4 bolt, 5 pivotal portion, 6 wire, 7 displacement preventing plate, 7a restriction portion, 7a1 gap, 7b tapered portion, 7c support portion, 7ca open end, 7cb extension portion, 10 door opening and closing mechanism, 11 catcher, 12 striker, 13 lock assembly, 14 tube, 15 door, 16 driver's seat, 17 floor plate, 18a front pillar, 18b center pillar, 18c rear pillar, 19 roof, 20 cab for a construction machine, 21 front frame, 22 rear body, 22a hydraulic oil tank, 22b engine room, 23 operating machine, 23a boom, 23b bucket, 23c boom cylinder, 23d bell crank, 23e bucket cylinder, 23f link, 24a front wheel, 24b rear wheel, 30 wheel loader.

The invention claimed is:

1. A cab for a construction machine, said cab comprising a door and a door opening and closing mechanism for opening and closing said door,
said door opening and closing mechanism including
a hollow tube having a hollow space therein and having a hole connecting said hollow space to outside of the tube,
a shaft support portion attached to said hollow tube, the shaft support portion having a pair of shafts protruding from respective side surfaces facing each other in a width direction,
a handle having a base portion including a pair of side portions that sandwich both of said side surfaces and each have a recess receiving a corresponding one of said pair of shafts, and a grip portion at an end of said base portion on the outside of the tube, said handle being movable in a direction in which said handle is pushed into said hollow space, and
a restriction member disposed on outward sides of the pair of side portions of the base portion restricting a movement of said base portion in said width direction, the restriction member disposed in a region extending between an end of said shaft support portion on the grip portion side inward to an end of said base portion on a hollow space side of the base portion.

2. The cab for a construction machine according to claim 1, wherein
said base portion has an extension portion extending in a direction opposite to said grip portion with respect to said shafts, and
said restriction member restricts the movement of said base portion in said width direction in said extension portion.

3. The cab for a construction machine according to claim 1, wherein said restriction member restricts the movement of said base portion in said width direction at least in said recess.

4. The cab for a construction machine according to claim 1, wherein said restriction member has a portion that is decreased in width with an increase in distance from said shafts in a longitudinal direction of said hollow tube.

5. The cab for a construction machine according to claim 1, wherein
said handle has a rib disposed between said pair of side portions, and said restriction member has a restriction portion restricting the movement of said base portion in said width direction and a support portion connected to said restriction portion and supported by said rib of said handle.

6. The cab for a construction machine according to claim 5, wherein said support portion has a notch portion formed to sandwich said rib, and said notch portion has a tapered shape or a round shape so as to have an opening that is decreased in width with an increase in distance from an open end of said notch portion.

7. The cab for a construction machine according to claim 5, wherein said support portion is in contact with at least one of said pair of side portions of said base portion.

8. A construction machine comprising said cab for a construction machine according to claim 1.

* * * * *